US008234531B2

(12) United States Patent
Mayer

(10) Patent No.: US 8,234,531 B2
(45) Date of Patent: *Jul. 31, 2012

(54) SYSTEM-ON-CHIP WITH MASTER/SLAVE DEBUG INTERFACE

(75) Inventor: Albrecht Mayer, Deisenhofen (DE)

(73) Assignee: Infineon Technologies AG, Neubiberg (DE)

(*) Notice: Subject to any disclaimer, the term of this patent is extended or adjusted under 35 U.S.C. 154(b) by 0 days.

This patent is subject to a terminal disclaimer.

(21) Appl. No.: 12/913,236

(22) Filed: Oct. 27, 2010

(65) Prior Publication Data

US 2011/0041010 A1 Feb. 17, 2011

Related U.S. Application Data

(63) Continuation of application No. 11/954,362, filed on Dec. 12, 2007, now Pat. No. 7,870,455.

(51) Int. Cl.
*G01R 31/28* (2006.01)
*G06F 11/00* (2006.01)
(52) U.S. Cl. .......................................... 714/734; 714/37
(58) Field of Classification Search .................. 714/734, 714/733, 724, 741, 744, 25, 31–33, 35–37, 714/30, 38, 39; 709/203, 208, 211, 212; 710/110, 33
See application file for complete search history.

(56) References Cited

U.S. PATENT DOCUMENTS

| 6,539,522 | B1* | 3/2003 | Devins et al. ............... 716/106 |
| 6,557,119 | B1 | 4/2003 | Edwards et al. |
| 6,715,042 | B1 | 3/2004 | Mirza et al. |
| 6,744,274 | B1* | 6/2004 | Arnold et al. .................. 326/16 |
| 6,779,145 | B1 | 8/2004 | Edwards et al. |
| 6,857,029 | B2* | 2/2005 | Ganasan et al. ............... 710/15 |
| 6,895,530 | B2* | 5/2005 | Moyer et al. ................... 714/25 |
| 7,080,283 | B1 | 7/2006 | Songer et al. |
| 7,107,494 | B1 | 9/2006 | Tischler |
| 7,197,680 | B2* | 3/2007 | Kimelman et al. .......... 714/724 |
| 7,263,566 | B2 | 8/2007 | Ganasan et al. |
| 7,475,303 | B1* | 1/2009 | Edgar et al. .................. 714/724 |
| 7,810,004 | B2 | 10/2010 | Mayer et al. |
| 2003/0217306 | A1 | 11/2003 | Harthcock et al. |
| 2006/0149958 | A1 | 7/2006 | Omathuna |

FOREIGN PATENT DOCUMENTS

DE 10 2006 016 303 A1 10/2007

* cited by examiner

*Primary Examiner* — Christine Tu
(74) *Attorney, Agent, or Firm* — Dickstein Shapiro LLP

(57) ABSTRACT

A System-on-Chip (SOC) integrated circuit (IC) debugging system includes a plurality of SOC ICs connected to a shared debug bus. One of the plurality of SOC ICs is a master SOC IC having a master/slave debug interface. The master/slave debug interface on the master SOC IC is a bidirectional debug interface operable to send and receive debug data between the SOC ICs and an external host system.

14 Claims, 2 Drawing Sheets

SYSTEM-ON-CHIP WITH MASTER/SLAVE DEBUG INTERFACE

RELATED APPLICATION

This is a continuation application of U.S. application Ser. No. 11/954,362 filed on Dec. 12, 2007.

FIELD OF THE DESCRIPTION

The present description relates generally to data processing and debug systems, and, in particular, to a System-on-Chip (SOC) configuration that captures and transfers debug data directly from multiple system SOCs using an on-chip Master/Slave debug interface.

BACKGROUND

System-on-Chip (SOC) technology operates and controls various types of systems. In general, SOC technology is the assembling of all the necessary electronic circuits and parts for a system (such as a cell phone or digital camera) on a single integrated circuit (IC), generally known as a microchip. SOC devices greatly reduce the size, cost, and power consumption of the system.

During SOC development, debuggers are connected to the debug interfaces (e.g. JTAG port) of the SOCs. To allow synchronous debugging and to save connector pins, all SOCs of the system typically share one debug bus (e.g. CJTAG) and one connector to the debug tool hardware for debugging and testing procedures. Using the debug bus, the system can be debugged (control, status and trace) through a single connector.

Because of the very high degree of integration on a single IC, in many cases, the number of Input/Output (IO) signals off the SOC device are reduced. Furthermore, as chip sizes increase, the number of transistors on a chip increases much faster than the possible number of IO signals off the chip. In many modern chip designs the chip is said to be pad or IO limited, which means that based on the size of the chip, there is insufficient room for all the IO signals that the designers would like, or need, to have routed off the chip. In such environments, in order to lower costs, conserve space, and provide enhanced security, SOCs and Systems in Packages (SiPs) can be configured without debug interfaces making testing and debugging operations problematic. In such cases, analysis is either infeasible or significant effort is needed to solder a debug connector to the board at a time when analysis is needed.

SUMMARY

A System-on-Chip (SOC) integrated circuit (IC) debugging system includes a plurality of SOC ICs connected to a shared debug bus. One of the plurality of SOC ICs is a master SOC IC having a master/slave debug interface. The master/slave debug interface on the master SOC IC is a bidirectional debug interface operable to send and receive debug data between the SOC ICs and an external host system.

These and further objectives, features and advantages will become more apparent from the following description when taken in connection with the accompanying drawings

DETAILED DESCRIPTION

Figure 1:
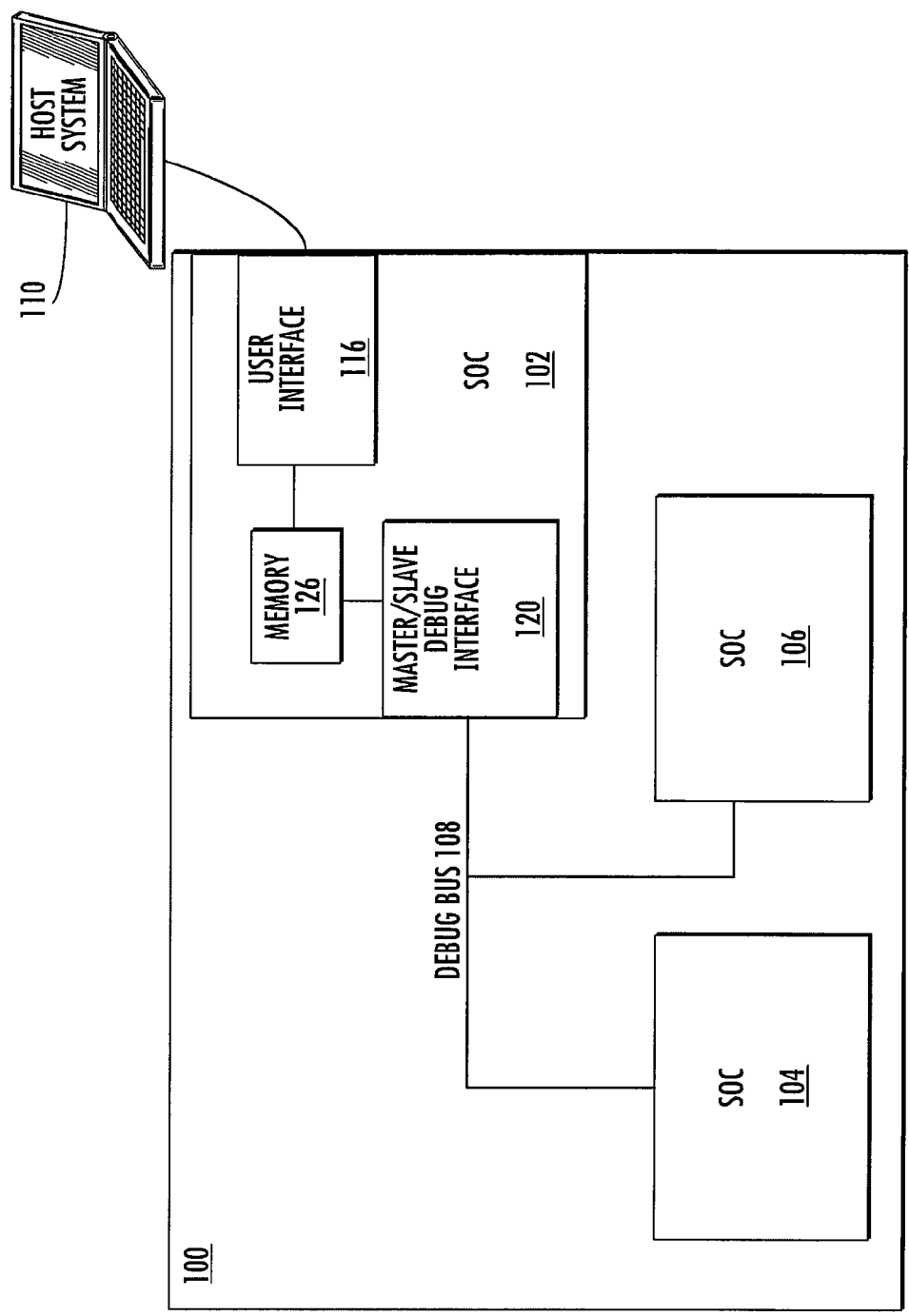
FIG. 1 illustrates an exemplary SOC IC debugging system in accordance with a preferred embodiment.
Figure 2:
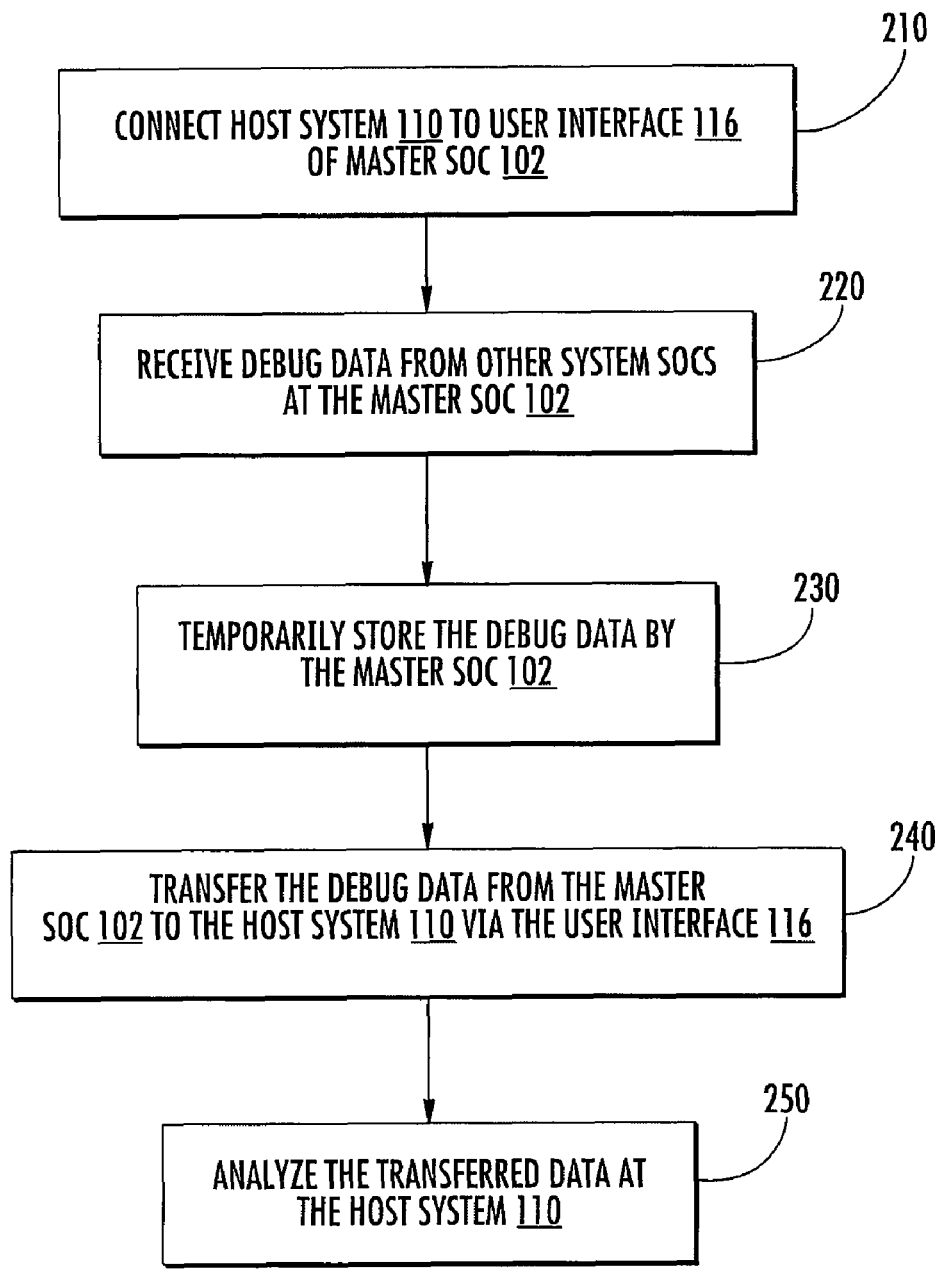
FIG. 2 is a flow diagram illustrating a method for debugging multiple SOC ICs through a user interface of a master SOC IC in accordance with a preferred embodiment.

FIGS. 1 and 2, discussed below, are by way of illustration only and should not be construed in any way to limit the scope of the claims. While described with respect to SOCs, those of skill in the art will understand that the principles may be implemented in any suitably arranged IC or system-in-package device.

Well-known circuits have been shown in block diagram form in order not to obscure the present description in unnecessary detail. Certain details regarding components of the SOCs described herein have been omitted insomuch as such details are not necessary to obtain a complete understanding of the present description and are within the skill of a person of ordinary skill in the relevant art.

FIG. 1 shows a printed circuit board (PCB) system 100 for debugging, testing and monitoring the performance information of several SOCs 102, 104, 106. While not explicitly shown in the figures, SOC 102 can include a processor core, a bus interface, and a system bus for communicating information. SOC 102 may further incorporate a digital signal processing engine, a general purpose microprocessor to provide control functionality, an on-chip memory 126 and a memory controller (not shown) for accessing memory 126. SOCs 104 and 106 may also include each of the above elements discussed with respect to SOC 102.

SOCs 102, 104 and 106 are connected to a shared debug bus 108. PCB system 100 is connected to host a system 110 directly via SOC 102. While host system 110 is shown independent of system 100, for purposes of debugging and testing a plurality of SOCs, connection with host system 110 can be considered an integral part of debug system 100. The host system 110 can be any type of computer (e.g., personal, mainframe, mini, networked, workstation, etc.) running host software that allows a user to target one or more components on SOCs 102, 104, 106 for debugging and to specify triggering parameters for tracing their processing cores.

SOC 102 includes a user interface 116 for connecting and communicating with host system 110. User interface 116 can be any type of user interface (e.g., serial port, USB, etc.). Host system 110 communicates with SOC 102 through user interface 116 and with the SOCs 104 and 106 through debug bus 108.

SOC 102 passes debug data, such as trace data, debug control signals and status data, to host system 110 through user interface 116. SOCs 104 and 106 to be debugged by host system 110 pass their debug data through Master/Slave debug interface 120 of SOC 102. Accordingly, SOC 102 takes on the role of a "Master" SOC and hereinafter will be referred to as Master SOC 102. Likewise, SOCs 104 and 106 act as slaves to Master SOC 102. The Master/Slave debug interface 120 is configured to initiate transactions on the debug bus 108. These transactions can include, but are not limited to, instructions to store data in memory, to read data from memory and to transfer data to and from host system 110.

Master/Slave debug interface 120 is for instance a two-pin bidirectional debug interface as defined in IEEE 1149.7 (CJTAG) consisting of a bi-directional Debug Data pin and a Debug Clock pin. Such an interface allows transferring commands to the device to control the on-chip debug system and to read and write data.

As mentioned briefly above, the debug data which is gathered by monitoring one or more of SOCs 102, 104, and 106 can include trace data. A trace is useful when analyzing the behavior, or misbehavior, of an SOC or the SOC's processing core or cores. The trace can show problems in the programming of an SOC processing core and point to errors in the SOC hardware. The trace can be thought of as an external recording of the activity of the SOC that a user can play back with software tools on the host system 110 in order to understand specific internal operations the SOC took and why.

The trace of external IO signals of an SOC can be augmented with other data to give a user additional visibility into SOC's 102, 104, 106 internal operations. Bringing selected internal signals of SOCs 102, 104, 106 to the outside of the system 100 as additional output signals accomplishes this augmentation.

System 100 includes an arbitrary number of SOCs with each SOC sharing a single debug bus 108 (e.g. CJTAG). With SOCs 102, 104, 106 connected to one shared debug bus 108, a single SOC (i.e. SOC 102) can take the role of a tool hardware front-end for the debug bus 108. Referring to FIG. 1, SOC 102 plays this role and hence can be referred to as "master SOC 102". On the physical level the direction of all signals is reversed for the master SOC 102 compared to a conventional setup, where all SOCs including the master SOC are accessed from the debug tool over the on-board debug connector. In accordance with a preferred embodiment, the debug interface of the master SOC 102 is operable in two different modes: In a default mode (e.g. reset value) it is a slave and operates like the debug interface of any other SOC controlled from the debug tool over a hardware interface, board connector and debug bus; in the second mode it is a master, which is enabled internally, the signal directions are reversed (e.g. clock output instead of input) and this master controls the slave debug interfaces of all other SOCs. In the later mode, a debug tool need not be attached at the debug connector on the board.

Master SOC 102 acts as a bus bridge between the host system 110, connected over the user interface 116, and the debug bus 108. Thus, the host system 110 accesses the SOCs 104 and 106 indirectly through Master SOC 102, with reversed direction of its debug interface. Master SOC 102 effectively replaces the need to connect conventional debug tool hardware to the PCB to carry out testing and debug procedures. Instead, Master SOC 102 is equipped with a debug monitor (not shown). The debug monitor is preferably software running on Master SOC 102.

This debug monitor is for instance a process running on the processor of Mater SOC 102. It is activated by the operating system. When debug requests arrive at the User Interface 116, the debug monitor analyzes the requests, schedules transfers over the Debug Bus 108 and sends back the results over the user interface 116. To limit the impact on the real-time behavior of the system these tasks can be distributed over different Interrupt Service Routines and real time processes. Those of skill in the art will realize that other implementations with less software and more hardware parts of the bus bridge functionality are also possible.

System 100 is functional without restrictions for debug control and status data exchange, which has low to medium latency and bandwidth requirements. Trace data requires much higher bandwidth. If the available bandwidth of the user interface 116 is on average lower than is needed for the trace data, an on-chip trace buffer (not shown) on Master SOC 102 can be used to capture such traces from the other SOCs 104 and 106 for a short period of time. If the available bandwidth of the user interface 116 is on average higher than needed for the trace data, then the full trace can be output over user interface 116.

FIG. 2 shows a method of debugging system 100 of FIG. 1. The method begins with connecting a host system 110 to the user interface 116 of the master SOC 102 (step 210). Next, debug data representing the activity of one or more SOCs 104, 106 is received by master SOC 102 via debug bus 108 (step 220). This data can be temporarily stored by master SOC 102 (step 230). Master SOC 102 transfers the debug data via its user interface 116 to the host system 110 for analysis (step 240). Finally, the data is received by host system 110 where it can be analyzed by the end user (step 250).

One skilled in the art will appreciate that additional variations may be made in the above description without departing from the spirit and scope of the description which is defined by the claims which follow.

What is claimed is:

1. A System-on-Chip (SOC) integrated circuit (IC) debugging system comprising a plurality of SOC ICs connected to a shared debug bus, at least one of the plurality of SOC ICs being a master SOC IC and comprising a master/slave debug interface, wherein the master/slave debug interface is a bidirectional debug interface operable to send and receive debug data between the SOC ICs.

2. The SOC IC debugging system of claim 1, wherein the master SOC IC comprises a user interface.

3. The SOC IC debugging system of claim 2, wherein the user interface is a USB interface.

4. The SOC IC debugging system of claim 2, wherein the user interface is a network interface.

5. The SOC IC debugging system of claim 2, wherein the user interface is a wireless interface.

6. The SOC IC debugging system of claim 1, wherein the master/slave debug interface is configured to initiate transactions on the shared debug bus.

7. The SOC IC debugging system of claim 6, wherein the transactions include instructions to store data in memories of the SOC ICs, and to read data from the memories of the SOC ICs.

8. The SOC IC debugging system of claim 7, wherein the master SOC IC comprises a user interface, and the transactions further include instructions to transfer data to and from a host system via the user interface.

9. The SOC IC debugging system of claim 1, wherein the master/slave debug interface is a two pin debug interface including one pin for a clock signal and another pin for bidirectional data.

10. The SOC IC debugging system of claim 1, wherein the at least one master SOC IC can be configured to function as a tool hardware front-end for the shared debug bus.

11. The SOC IC debugging system of claim 1, wherein the at least one master SOC IC functions as a bus bridge between a host system and the shared debug bus.

12. The SOC IC debugging system of claim 1, wherein the at least one master SOC IC is connected to a host system through the user interface and accesses the non-master SOC ICs indirectly through the at least one master SOC IC.

13. The SOC IC debugging system of claim 1, wherein the at least one master SOC IC includes software acting as a debug monitor.

14. The SOC IC debugging system of claim 1, wherein the at least one master SOC IC includes a trace buffer for capturing traces from the other SOC ICs.

* * * * *